(12) United States Patent
Andersen et al.

(10) Patent No.: US 6,893,304 B1
(45) Date of Patent: May 17, 2005

(54) COURSE-STABLE, FAST, SEA-GOING SHIP COMPRISING A HULL THAT IS OPTIMIZED FOR A RUDDER PROPELLER

(75) Inventors: Peter Andersen, Hamburg (DE); Bjoern A. Henriksen, Oslo (NO); Kay Tigges, Harsefeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/049,069

(22) PCT Filed: May 10, 2000

(86) PCT No.: PCT/DE00/01454

§ 371 (c)(1),
(2), (4) Date: Oct. 1, 2002

(87) PCT Pub. No.: WO00/68072

PCT Pub. Date: Nov. 16, 2000

(30) Foreign Application Priority Data

| May 11, 1999 | (WO) | PCT/DE99/01422 |
| Jun. 24, 1999 | (DE) | 199 28 961 |
| Jun. 24, 1999 | (WO) | PCT/DE99/01842 |
| Aug. 3, 1999 | (DE) | 299 13 498 U |
| Feb. 25, 2000 | (DE) | 200 03 451 U |
| Feb. 25, 2000 | (WO) | PCT/DE00/00537 |

(51) Int. Cl.[7] .............................................. B63H 1/28
(52) U.S. Cl. ...................................... 440/66; 114/61.28
(58) Field of Search .................. 114/61.27, 61.28, 114/61.29, 61.3, 62, 140, 288, 289, 290; 440/6, 66, 68, 69, 70, 71

(56) References Cited

U.S. PATENT DOCUMENTS

| 3,450,090 A | 6/1969 | Best, Jr. |
| 4,406,630 A | 9/1983 | Wood, Jr. |
| 5,417,597 A | 5/1995 | Levedahl |

FOREIGN PATENT DOCUMENTS

DE  2928634  11/1980

(Continued)

OTHER PUBLICATIONS

ABB Azipod, "Azimuthing electric propulsion drive", pp. 1-6, Dec. 5, 1998, XP000783547.

(Continued)

*Primary Examiner*—Andrew D. Wright
(74) *Attorney, Agent, or Firm*—Baker Botts LLP (57) ABSTRACT

A course-holding, high-speed, sea-going vessel having a hull which is intended to hold payloads or passengers and at least one rotatable, preferably electric, rudder propeller (POD) which is arranged gondola-like under the hull of the vessel and has, to supply it with power, at least one motor/generator unit which is arranged in the hull of the vessel, the hull of the vessel having at least in part a bottom which rises somewhat toward the two sides of the hull, and in that the front part of the hull is designed so as to stabilize the course and movement of the vessel and ending under water, in particular in a relatively slender bow with a bulb, and in that a flow-guiding element (skegg) is arranged upstream of each rudder propeller in order both to optimize the handling characteristics and to achieve an optimized flow against the rudder propeller, which has a displacement volume for the water flowing against the respective rudder propeller.

21 Claims, 7 Drawing Sheets

FOREIGN PATENT DOCUMENTS

| | | |
|---|---|---|
| DE | 3730008 | 9/1987 |
| DE | 29619385 | 4/1997 |
| DE | 19618247 | 11/1997 |
| DE | 19640481 | 5/1998 |
| DE | 127754 | 5/2000 |
| EP | 0831026 | 3/1998 |
| GB | 703777 | 2/1954 |
| GB | 2071580 | 9/1981 |
| WO | 9743169 | 11/1997 |

OTHER PUBLICATIONS

"Marine Engineering", 1971, SNAME, p. 208, XP002148506.

"Handbuch der Werften", 1963, p. 26, XP002148498.

Gloel & Gragen: "Ein neuses hocheffizientes Antriebssystem", pp. 40-44, Oct. 1997, XP000720093.

The Motor Ship, "Choice of propulsion solutions widens", pp. 107-111, Sep. 1994, pp. 107-111, XP000466436.

Goldberg, "Principles of Naval Architecture", 1988, SNAME, p. 107, XP002148499.

COURSE-STABLE, FAST, SEA-GOING SHIP COMPRISING A HULL THAT IS OPTIMIZED FOR A RUDDER PROPELLER

FIELD OF THE INVENTION

The invention relates to a course-holding, high-speed, sea-going vessel having a hull which is intended to hold payloads or passengers, and at least one rotatable, preferably electric, rudder propeller (Pod) arranged in a gondola-like manner under the hull of the vessel and to which power is supplied by at least one motor/generator unit located in the hull of the vessel.

BACKGROUND OF THE INVENTION

Vessels which are relevant to the present invention are, for example, cruise liners having a keel structure in which the rudder and the shaft system have been replaced by one or more electric rudder propellers. The actual shape of the vessel is essentially unchanged. An example is disclosed in the publication "The SSP Propulsor" from Siemens and Schottel, No. 159U559 04982.

SUMMARY OF THE INVENTION

The object of the present invention is to provide a novel, high-speed, sea-going vessel having an overall design which is optimized for the use of electric rudder propellers and by which all the advantages which can be obtained by using electric rudder propellers, namely the utilization of space, the handling characteristics, the resistance of the vessel and the efficiency of the propulsion of the vessel are fully exploited.

This object is achieved by designing the hull of the vessel so as to be optimally adapted to the electric rudder propeller drive both in terms of the utilization of space and flow. The hull of the vessel has a bottom portion which rises somewhat toward the two sides of the hull. The front part of the hull is designed to stabilize the course and movement of the vessel and ends under water, in particular in a relatively slender bow with a bulb, with a flow-guiding element (skegg) arranged upstream of each rudder propeller in order to optimize the handling characteristics and to achieve an optimized flow against the rudder propeller, which has a displacement volume for the water flowing against the respective rudder propeller. This novel design makes it possible both to configure the space in the hull so as to maximize its utilization, and to obtain stable course-holding and sea-going characteristics with the smallest possible resistance of the vessel in the water, thus optimizing its drive efficiency. By means of the invention, useful space is significantly increased by more than 10%, and the efficiency of propulsion is also increased by several percent. Thus, the shipowner, or charterer is provided with an increased payload volume and reduced energy consumption when operating the ship. The invention further enables the vessel to travel higher speeds.

The use of skeggs increases the wetted surface of the body of the vessel. This well known fact which has previously discouraged experts in the field from using large flow-guiding elements on the lower part of a sea-going vessel which is surprisingly compensated for by advantages achieved, such as an increase in the propulsion efficiency and by an optimized low-resistance outgoing flow in the stem area of the vessel. Accordingly, the use of skeggs according to the present invention provide the vessel with such great advantages that they more than compensate for any disadvantage resulting from the increased wetted surface. This is particularly so in vessels which are driven by rudder propellers in a multiple arrangement.

The vessel according to the invention disproves the prejudices of experts in respect of the use of voluminous underwater flow-guiding elements for sea-going vessels, in particular where the overall design of the hull is optimized for the use of rotatable rudder propellers, and said rudder propellers are appropriately dimensioned and arranged. In this context, it is preferred to use low electric rudder propellers which permit particularly favorable skegg designs (small skegg surfaces), the shanks and motor housing of which can be included in the optimization of flow.

In a preferred embodiment of the present invention, the bow is designed with a partial concave profile, particularly in the lower part. By doing so, it is possible to select an overall, relatively full shape for the forebody of the vessel without having to dispense with a course-holding effect of the bow.

In a further preferred embodiment of the present invention, the flow-guiding elements (skeggs) are hook-shaped at the end in the longitudinal direction. Even more preferably, their design is matched to the specific type of vessel and they have an outgoing flow characteristic which gives rise to a decelerated flow against the housing of the rudder propellers largely free of separation. This results, inter alia, in the possible increase in the efficiency of propulsion of the rudder propellers. The rudder propellers are preferably arranged and set in such a way as to produce a further improvement in the resistance-optimized outgoing flow of the rear part of the vessel and an increase in the propulsion efficiency. This is achieved as a result of an angular position of the rising stem in a vertical direction in respect of the bottom of the vessel and the longitudinal direction of the vessel. The flow-guiding elements (skeggs) may be angularly arranged toward the outside on the bottom of the vessel, the angle being between 3° and 10°, in particular approximately 7°. Together with a design of the flow-guiding elements which is droplet-shaped in cross section, a flow channel which is designed so as to widen in the upward direction, produces a separation-free, decelerated flow against the rudder propellers. Good course-holding stability may also be obtained and maintained even when there are rolling movements.

In a further preferred embodiment of the present invention, the flow-guiding elements, the lower part of the hull, and the bow are designed in terms of shape and length so as to bring about a low-resistance straight course for the vessel. Here, the flow-guiding elements form an integral part of the hull, the skegg parameters are as follows: on average the skegg width is in the range of about 0.1 to 0.06 of the width of the vessel, and preferably approximately 0.08 of the width of the vessel; the skegg depth is approximately in the range of about 1.0 to 0.74 of the draft of the vessel, and preferably approximately 0.92 of the draft of the vessel; the skegg also has an offset with respect to the center of the vessel approximately equal to the distance between the respective propeller shaft and the center of the vessel; the skegg length is preferably between about 0.25 and 0.38 of the length of the water line at the designed draft, and preferably about 0.32 of the length of the water line at the designed draft. A skegg is preferably arranged in front of each rudder propeller.

It is particularly preferred where the skeggs are designed as front vanes for the rudder propellers and otherwise comply with the conditions specified above. By doing so, the rudder effect is amplified at small angles of the rudder propeller, and the vessel reliably follows the rudder angles with the stem without significantly drifting in a lateral direction.

In a further preferred embodiment of the present invention, each rudder propeller has preferably two individual propellers, in particular unidirectional propellers which are arranged in a directional overall outgoing flow at the rear of the vessel, which leads to a decelerated oncoming flow in the vicinity of the rudder propellers. This results advantageously in a high level of efficiency of propulsion by virtue of the combination of rudder propeller and shape of the vessel.

In a further preferred embodiment, diesel (gas-turbine) generator units are located behind the bow area, by virtue of which the hull is designed to run in a particularly directionally stable fashion, since apart from the bulb at the bow with its partially concave transition into the shape of the front of the vessel and the skeggs, there are no additional flow-guiding elements. This results in a good course-holding characteristic of the vessel with a low-resistance flow around the vessel and an optimized outgoing flow at the stem.

In another preferred embodiment of the present invention, the rudder propellers are arranged on shanks which act as flow-guiding elements, and which, in particular are short and have housings for the propeller shaft which act as flow-guiding elements. This results both in an optimized design of the useful space in the vessel and also in good maneuverability. Further, the shanks and housings of the rudder propellers are shaped in such a way that together with the flow-guiding elements on the hull and the shape of the stern, the end of the hull is optimized in terms of outgoing flow and has low resistance. This optimization, which is determined on the basis of towing tank trials, makes the advantages of a vessel hull which is optimized for drive by rudder propellers particularly striking. In sum, an increased level of propulsion efficiency together with reduced vessel resistance are obtained. These preferred embodiments are used particularly in hulls which are designed for speeds of between 20 and 36 knots. At such high speeds, the previously unattained course-holding stability, combined with the high level of propulsion efficiency and the low vessel resistance provide significant advantages.

The present invention is particularly useful when the vessel is of a Roro or Ropax design, the rudder propellers being designed as low rudder propellers and being arranged underneath the main car deck which extends from the stern to the bow. This results in a specific optimization of the useful space for Roro or Ropax vessels. The advantages achieved may, of course, also obtained for container vessels or passenger vessels.

The drives from the Siemens/Schottel Consortium referred to in the background of the invention can be configured as low rudder propellers without major changes because they have a particularly low hull/shank junction. With a slip ring arrangement within the upper part of the shank, and rotary motors directly at the upper edge of the shank (or in the upper part of the shank), a low overall height of the drive is achieved, and the stern of the vessel can be designed so as to be virtually free of the influence of the drive units on the inside. Auxiliary units for the rudder propeller, such as the hydraulic pumps, are arranged essentially next to the hull/shank junction so that a low bearing level for entry ramps for vehicles etc. can be installed in the stem area. The main car deck can be arranged directly above the rotary bearing of the low rudder propeller, and an access to the shank of the rudder propeller can then be provided through a shank cover.

In another preferred embodiment of the vessel, at least two motor/generator drive units are arranged on the bottom of the vessel. This ensures good stability of the vessel with an optimized car deck arrangement. The space for the motor/generator units with the associated control and switching devices is arranged in the hull and bounded by bulkheads in such a way that the SOLAS and IMO stability requirements and the Stockholm Convention for sea-going vessels are met. Thus, according to the present invention, not only is the vessel optimized in terms of space and consumption, but also which is very safe.

BRIEF DESCRIPTION OF THE DRAWINGS

The present invention is disclosed in great detail below in conjunction with the drawings in which.

DETAILED DESCRIPTIONS OF THE INVENTION

Figure 1:
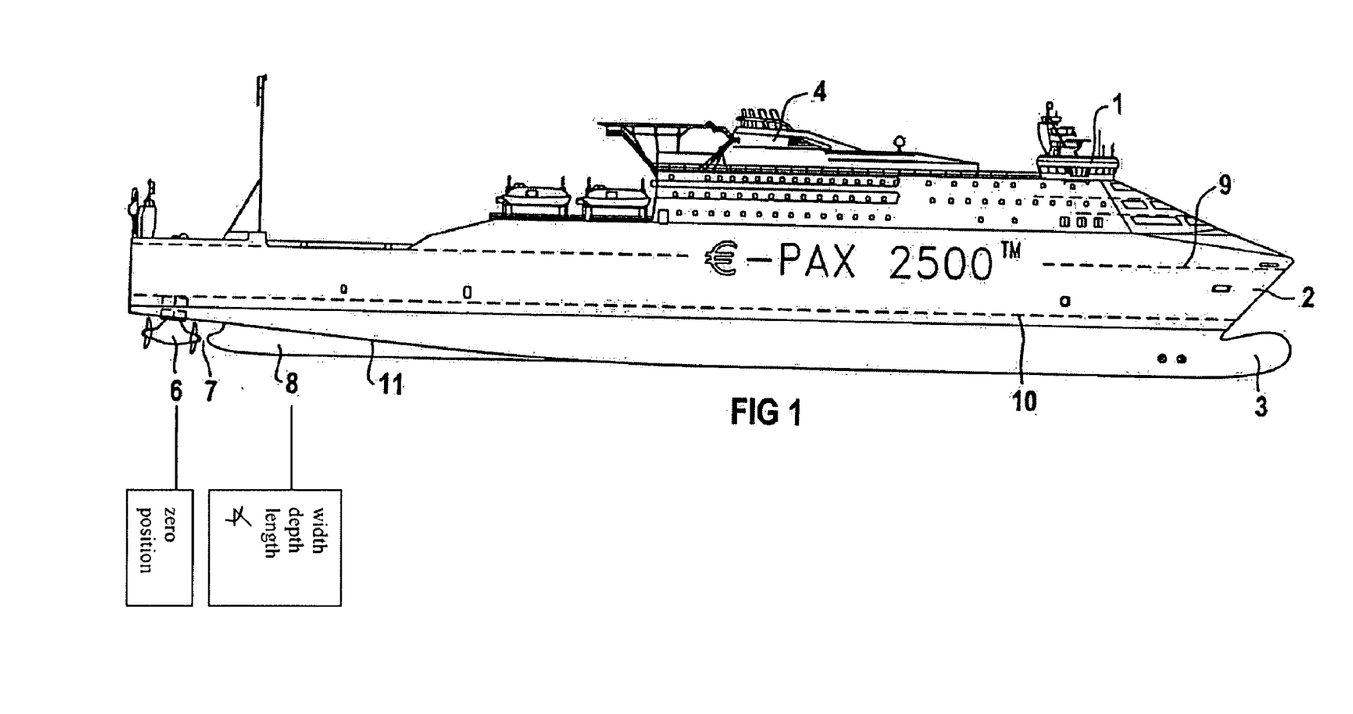
FIG. 1 illustrates the side view of a Ropax vessel which is designed in accordance with the invention.

In FIG. 1, 1 designates the bridge of the vessel; 2 designates the bow; and 3 the bow bulb. The weather deck 9, which can extend from the aft to the fore part of the vessel, is shown extending into the bow 2. At a suitable distance behind bridge 1 is the funnel structure 4, the exhaust pipes, arrangement of which can be selected relatively independently of the current position of the diesel or gas turbine generator units. Like the weather deck 9, the main freight deck 10, for example a main car deck, is designed so as to extend from the stem to the bow. The short rudder propeller 6, which according to the invention is advantageously embodied as a double rudder propeller enables the main car deck 10 to be continuous even in the stem area. This results in particularly small propeller diameters accompanied by a good degree of efficiency. A skegg 8 is shown ascending in a hook shape at a distance 7 in front of the rudder propeller 6 and which is arranged in front of the rudder propeller 6. The distance 7 is essential for a vibration-free flow against the rudder propeller 6, and is as a rule 1% of the length of the vessel but can also be 2% to 3% of the length of the vessel. The underwater part of the vessel 11 is designed so as to rise gradually in the stem area so that a largely eddy-free, low-resistance efflux is produced in the stem area. Overall, with the type of vessel according to the invention, the shape of the bow and of the stem, the size and arrangement of the rudder propellers and the skeggs are preferably matched to one another in such a way that the vessel has good course-holding characteristics and at low resistance results in a high level of propulsion efficiency of the drive.

Figure 2:
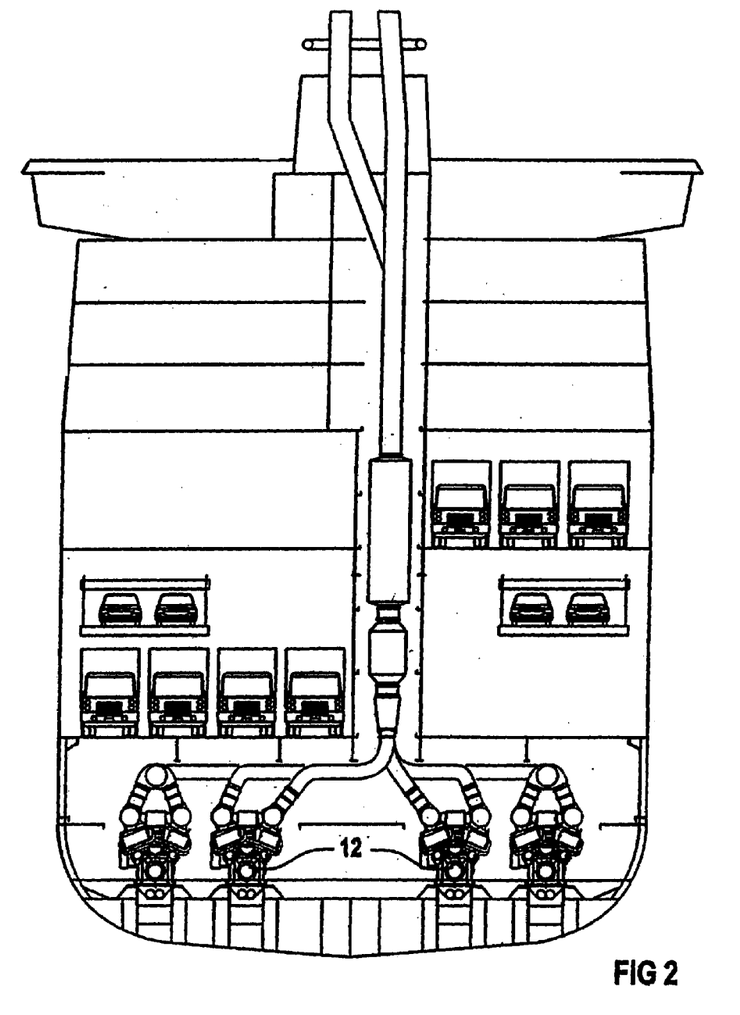
FIG. 2 illustrates a cross section at the level of the machine room through a vessel corresponding to FIG. 1.

In FIG. 2, the diesel generator units 12 are shown with off-center exhaust-gas ducting. This produces lorry loading tracks which can be optimally configured.

Figure 3:
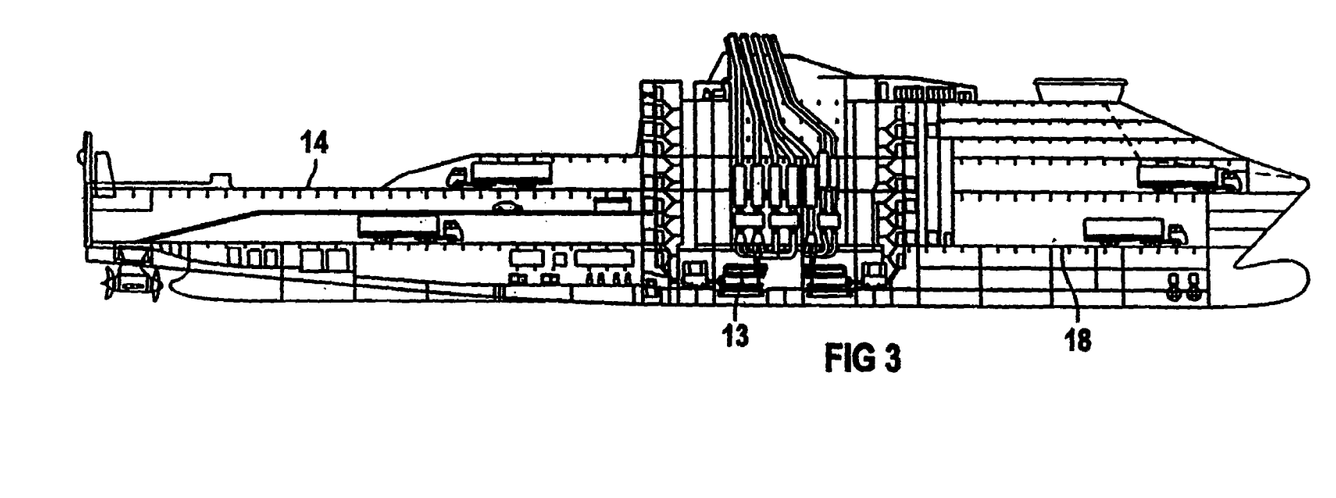
FIG. 3 illustrates a longitudinal sectional view of the interior of the vessel and the hull shape of the vessel corresponding to FIG. 1.
Figure 4:
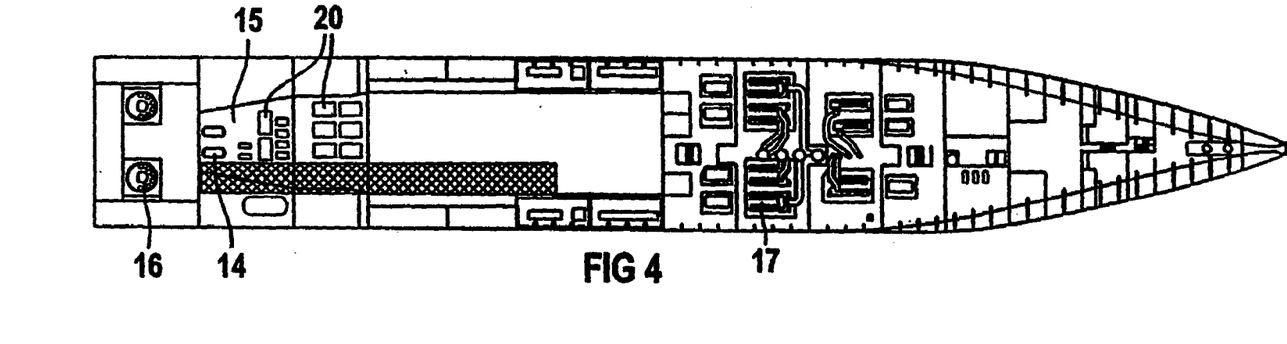
FIG. 4 illustrates a section through a vessel corresponding to FIG. 1 at the level of the second deck.
Figure 5:
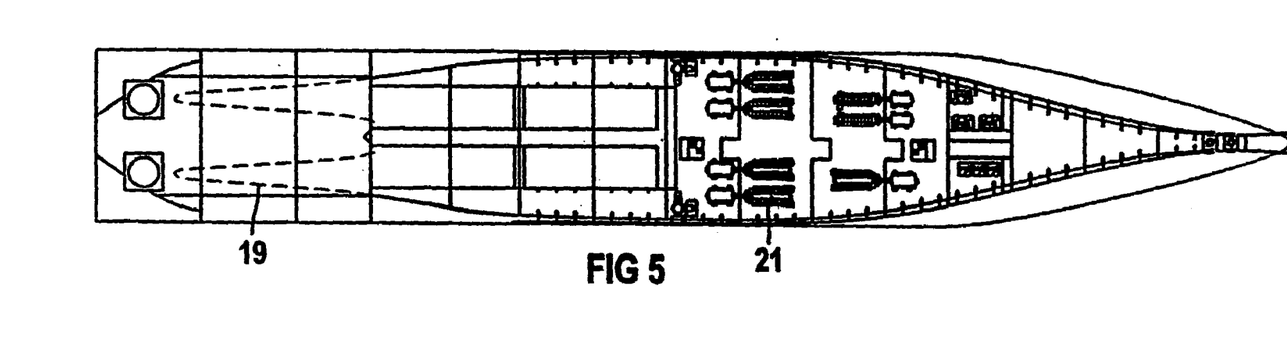
FIG. 5 illustrates a section through a vessel corresponding to FIG. 1 at the level of the first deck.

FIGS. 3, 4 and 5 show, respectively, machine rooms with diesel units 13, 17 and 21 at the bottom center/front part of the vessel. As is apparent, small diesel or gas turbine units can be distributed in such a way to provide a continuous main car deck. The precise installation location is selected, for example in the center area of the vessel, in such a way that favorable longitudinal mechanical stresses (smooth water moment, transverse force profile) for the vessel are obtained.

In FIG. 3, the main car deck 18 and the weather deck 14 are shown. In FIG. 4, 20 designates converters and transformers, and 14 designates hydraulic units in the stem. The hydraulic units in the stem are advantageously arranged in a hydraulic room 15 approximately at the level of the upper edge of the rudder propellers 16. These units therefore lie below the continuous main car deck.

In FIG. 5, 19 designates the skeggs, shown in phantom, and which are directed rearwardly at this level. The skeggs form an integral component of the underside of the hull.

Figure 6:
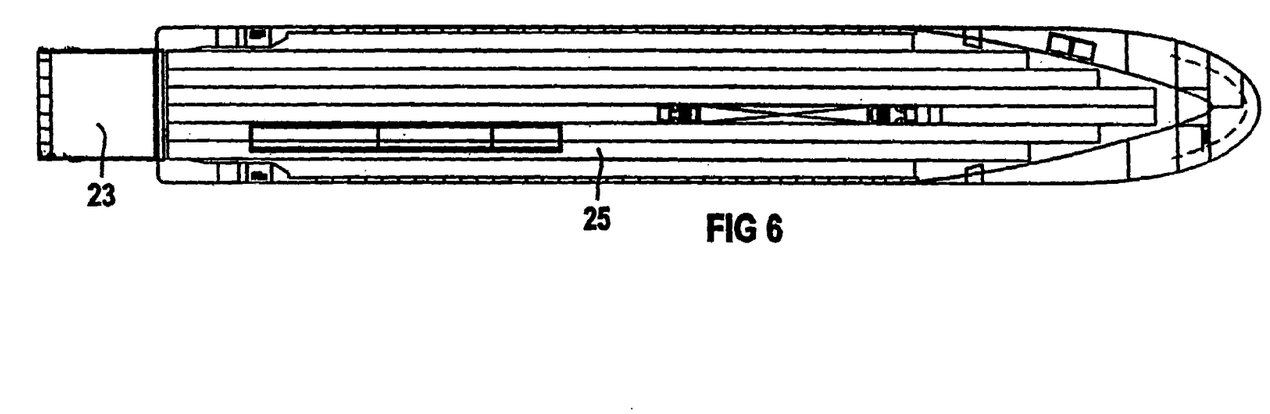
FIG. 6 illustrates the car deck with the loading ramp of a different but similar vessel constructed in accordance with the present invention.
Figure 7:
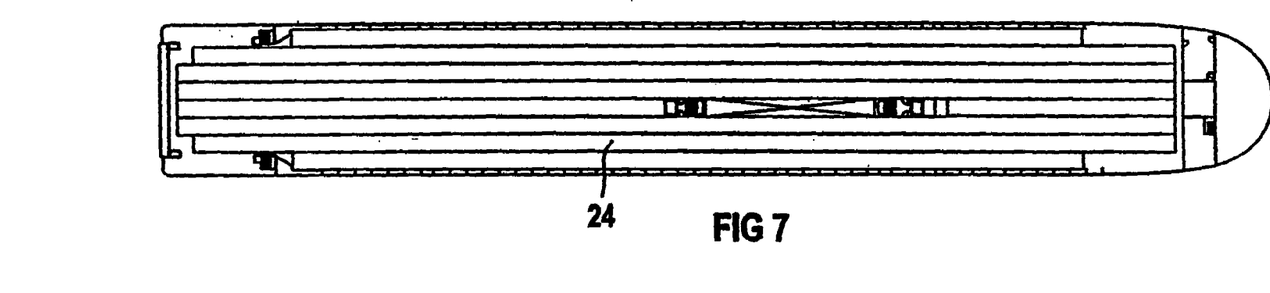
FIG. 7 illustrates the weather deck of a different but similar vessel which is constructed in accordance with the present invention.

A preferred design of the vessel's deck is shown in FIG. 7 (weather deck) and FIG. 6 (main car deck). In FIGS. 6 and 7, the parking aisles for the motor vehicles, containers, etc. are designated by 24 and 25. The entry ramp for the vehicles is designated as 23. Thus, as is apparent, the design according to the present invention, provides more parking spaces for vehicles or containers than has ever been achieved before.

Figure 8:
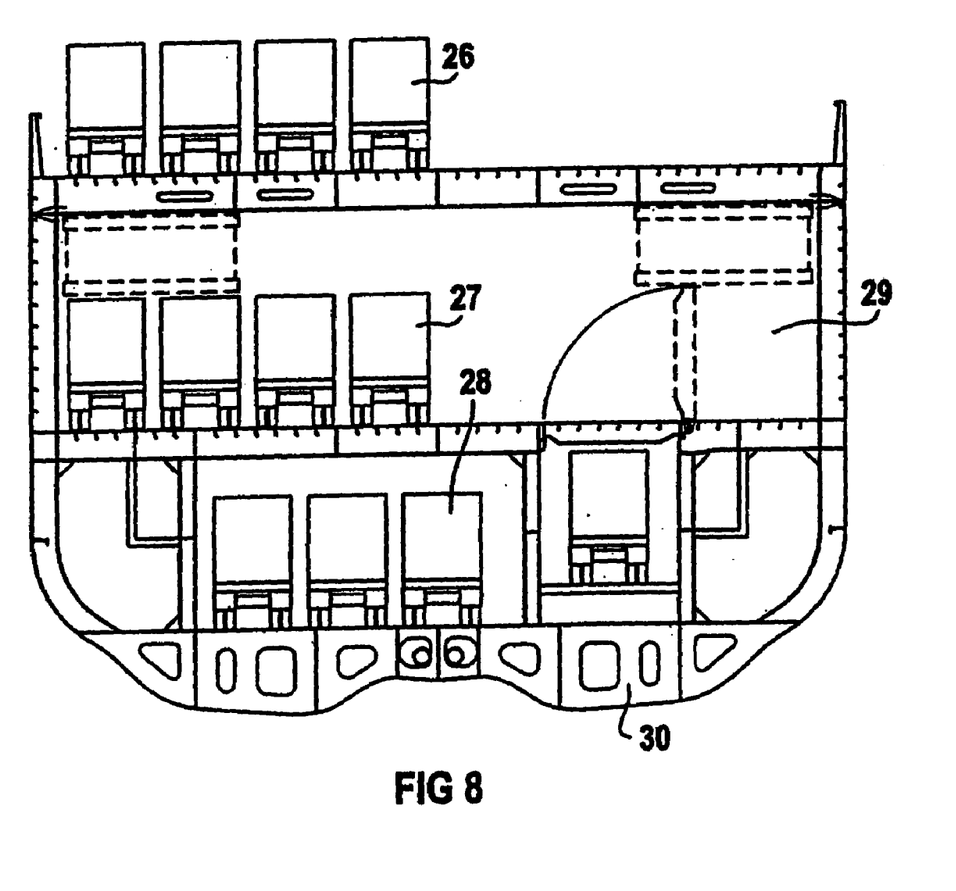
FIG. 8 illustrates a partial section through the afterbody of a different but similar vessel in accordance with the present invention with integral skeggs.

FIG. 8 shows a cross section through the vessel in the area where the skeggs begin. Here, the trucks on the weather deck are designated by 26. The trucks on the main car deck are designated by 27, and the trucks in the lower part of the vessel by 28. When carrying passenger cars, side deck tracks 29 can be raised and can be driven onto from the main deck. The front parts 30 of the skeggs are integrated into the double bottom and the steel frame and stringer system. The skeggs therefore form integral parts of the structure of the vessel.

Figure 9:
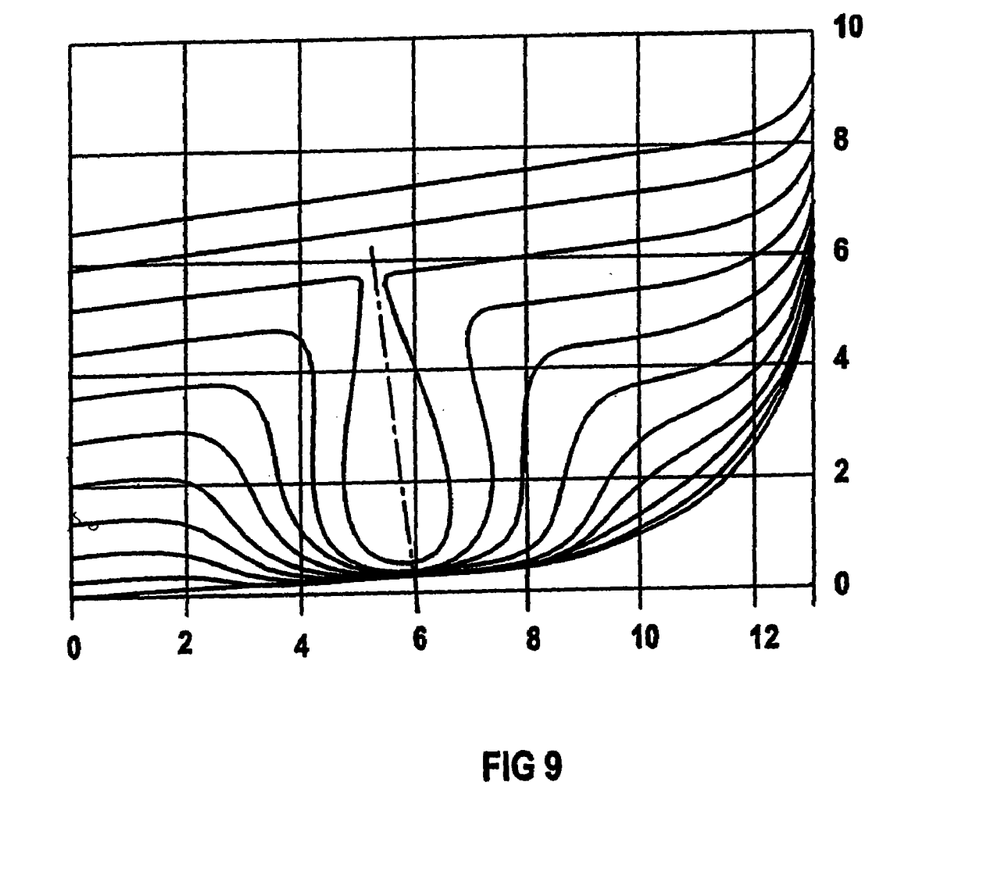
FIG. 9 illustrates the linear outline of vessels in the skegg area.

Finally, FIG. 9 serves to explain the skegg parameters which are selected as a function of the type of vessel. The skegg parameters are varied, depending on whether the vessel is a pure Roro vessel, in which only a relatively low level of traveling comfort is required, a Ropax ferry, a container or a passenger vessel. The distance between the rudder propeller and the rear edge of the skegg is also selected according to these criteria because these are important for the smooth running of the rudder propellers. The greater the distance, the lower the transmission of vibration by pressure pulses from the rudder propellers is to the hull. The pressure pulses from the propellers of the rudder propellers to the respective shank and hull of the vessel are, on the other hand, advantageously influenced by technical control measures.

What is claimed is:

1. A course-holding, high-speed, sea-going ship comprising a hull designed to hold payloads including passengers, two rotatable rudder propellers arranged gondola-like under the hull and which are supplied with power by a motor/generator drive unit arranged in the hull of the ship, wherein the hull has a bottom which rises over a small angle toward the hull's two sides, and the hull's front part is designed to stabilize the ship's course and movement and terminates under water in an elongated bow section formed with a bulb, and further comprising a flow-guiding element arranged upstream of each rudder propeller, said flow-guiding element terminating in a hook-shaped end in the longitudinal direction, said element's design being matched to a specific type of ship, and which has an outgoing flow characteristic which results in a decelerated flow against the rudder propeller.

2. The ship according to claim 1, wherein the bow has a lower part designed with a concave profile.

3. The ship according to claim 1, wherein the flow-guiding elements are arranged outwardly on the bottom of the ship at an angle of between about 3° and 10°.

4. The ship according to claim 1, wherein the rudder propellers are outwardly inclined, approximately perpendicular to the ship's bottom which rises by a small angle toward the ship's two sides.

5. The ship according to claim 1, wherein a zero position of the rudder propellers is selected so as to deviate from the longitudinal direction of the ship thereby producing a flow channel between the rudder propellers.

6. The ship according to claim 1, wherein the rudder propellers have axes of rotation aligned to rise toward the stem.

7. The ship according to claim 1, wherein the flow-guiding elements, together with a lower part of the hull and the bow are designed in terms of shape and length to produce a straight course for the ship.

8. The ship according to claim 1, wherein the flow-guiding elements form an integral part of the hull, and have parameters selected from the following:
   width in the range of about 0.1 to 0.06 of the width of the ship;
   depth in the range of about 1.0 to 0.74 of the draft of the ship;
   offset of the flow-guiding element's center with respect to the center of the ship equal to the distance between an associated propeller shaft and the center of the ship;
   length of the flow-guiding element in the range of about 0.38 to 0.25 of a waterline length at a designed draft.

9. The ship according to claim 1, wherein the flow-guiding elements are designed as front vanes for the respective rudder propeller.

10. The ship according to claim 1, wherein each rudder propeller has two individual unidirectional propellers.

11. The ship according to claim 10, wherein the propellers are directionally arranged in an overall outgoing flow to the rear of the ship, which outgoing flow is decelerated in the vicinity of the rudder propellers and is oriented by the flow-guiding elements to produce low-loss flow against the rudder propellers.

12. The ship according to claim 1, wherein the hull is designed to accommodate an arrangement of drive units behind the bow area having a horizontal trim.

13. The ship according to claim 12, wherein the drive units are arranged at least in the center of the ship in order to minimize mechanical stresses, including smooth water moment and transverse-force profile.

14. The ship according to claim 12, wherein the rudder propellers have shanks and housings which are shaped and arranged so that, together with the flow-guiding elements and the hull's stem shape, they produce an end of the hull of the ship, the shape of which allows water to run off without eddying.

15. The ship according to claim 12, wherein the bow's bulb is a flow-guiding element, and wherein said ship has only three flow-guiding elements including the bow's bulb.

16. The ship according to claim 12, having at least two motor/generator drive units, said motor/generator units being distributed and being arranged on the bottom of the ship and emitting exhaust gases centrally.

17. The ship according to claim 1, wherein the hull is designed for speeds of between 20 and 36 knots.

18. The ship according to claim 1, designed as a Roro or Ropax ship, having low rudder propellers arranged underneath a main car deck which can be driven onto from behind and can be designed so as to extend from the stern to the bow.

19. The ship according to claim 1, wherein the motor/generator units have associated control and switching devices all of which is arranged in a space bounded by bulkheads in the ship.

20. The ship according to claim 1, configured as a container ship.

21. The ship according to claim 1, configured as a cruise liner.

* * * * *